INVENTOR.
John Nagy, Jr.

ATTORNEY

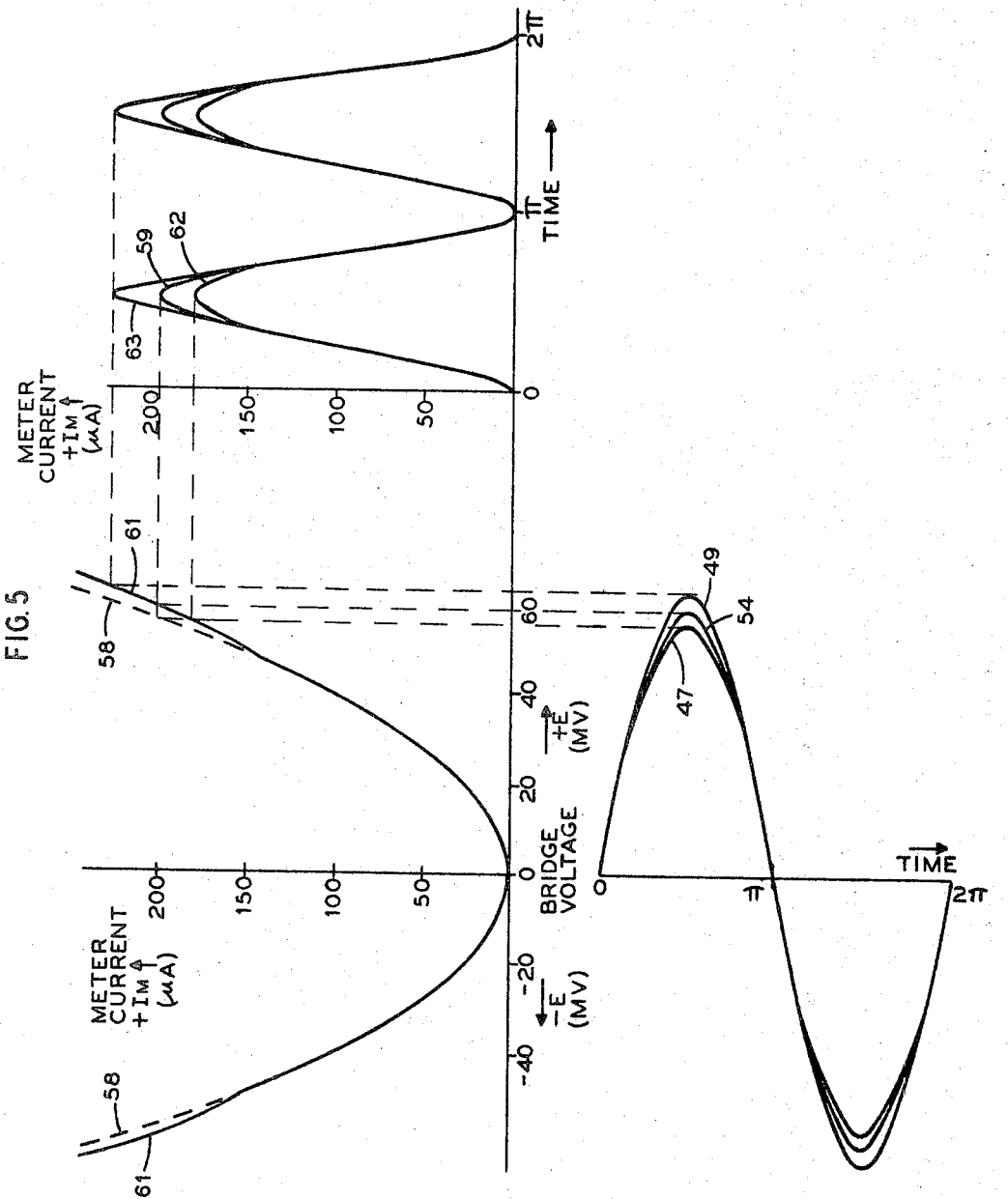

United States Patent Office 3,488,592
Patented Jan. 6, 1970

3,488,592
RECTIFIER CIRCUITS WITH COMPENSATION TO APPROXIMATE THE SQUARE LAW CHARACTERISTIC
John Nagy, Jr., Union, N.J., assignor to Weston Instruments, Inc., Newark, N.J., a corporation of Delaware
Filed May 1, 1967, Ser. No. 635,229
Int. Cl. G01r 19/22
U.S. Cl. 324—119                                      14 Claims

ABSTRACT OF THE DISCLOSURE

A nonlinear rectifier characterized by an essentially parabolic transfer characteristic has its conformance to square law improved by a compensating circuit that is coupled to the rectifier and includes a pair of series-connected tunnel diodes and a resistor in series therewith. In response to, for example, a pure sinusoidal input signal, the compensating circuit generates a compensating voltage having a controlled amount of a third harmonic component which provides a truer square law characteristic to the rectified current produced by the rectifier.

---

This invention relates to electrical meter circuits and, more particularly, to a meter rectifier circuit which is compensated to closely approximate a square law characteristic.

Rectifier type R.M.S. meter circuits in which applied A.C. voltages or currents are rectified and then measured by a D.C. meter conventionally utilize nonlinear bridge networks for squaring the A.C. voltages or currents. By utilizing full wave rather than half wave rectifier bridges, the error introduced in the reading of the D.C. meter by even harmonics in the A.C. voltage waveform is substantially reduced. Accordingly, full wave rectifying bridges are more extensively used in meter applications to square the voltage or current input waveform which is applied to the bridge input terminals.

Full wave rectifier bridges may take various forms, one of the more recent types having a tunnel diode in one or more of the bridge arms. This type of rectifier bridge is generally considered preferable to rectifier bridges which incorporate other types of diodes in the bridge arms primarily because the voltage-current characteristics of the tunnel diodes are practically independent of temperature variations. As a contrast to tunnel diodes, the voltage-current characteristics of conventional diodes, characterized as having a high cathode to anode resistance, can be expected to vary 2 millivolts per degree centigrade. Since it is generally considered unfeasible to provide means for temperature controlling the rectifying bridge, tunnel diode bridges are considered more practical.

The transfer characteristic of a conventional rectifier bridge having a tunnel diode in each of its arms may be expressed mathematically by a series expansion of odd and even order terms. The fundamental term may be eliminated from the transfer characteristic by shunting one arm of the bridge with a resistor and the higher order odd terms may be made negligibly small by matching the bridge diodes. Considering the even order terms, the second order term is the term which is utilized to effect the bridge squaring function and all even order terms higher than fourth order introduce negligible errors into the transfer characteristics. The effect of the fourth order term becomes noticeable when the peak value of the input waveform is larger relative to the normal full scale value of the input signal or when the input signal is rich in harmonics which cause a peaking of the input waveform. Thus, although it is desired that the rectifier bridge provide a true square law response to sinusoidal or more complex input waveforms, as a practical matter, an uncompensated rectifying bridge of this type will provide a true squaring of the input voltage only for relatively low values of input voltage.

The prior art has resorted to various expedients in attempting to provide the bridge rectifier with better conformance to true square law characteristics. However, these expedients typically require that the harmonic content of the input signal be limited, or operate on the basis of separating the undesired harmonic from the input waveform of fundamental frequency and then measuring the fundamental frequency using, for example, a linear rectifier. Obviously, if the measuring instrument is only capable of measuring input signals containing a limited amount of harmonic content, the number of measuring applications to which the measuring circuit may be applied is considerably reduced. Conventional measuring circuits which are designed to effect the separation of undesired harmonics from the fundamental frequency typically require expensive multicomponent tuning circuits and, further, either require separate power sources or make large energy demands on the input signal. As will be evident, the use of tuned circuits and separate power sources substantially increases the complexity and cost of the measuring instrument and the larger the energy demand which is made on the input signal the lower will be the voltage and current sensitivity of the instrument circuit.

It is an object of this invention to provide an electrical measuring circuit which provides true square law response to input signals having complex waveforms and which does not require tuned circuits or separate power sources and makes minimal energy demands on the input signal.

According to this invention, a circuit for measuring the R.M.S. value of an electrical input signal utilizes a nonlinear bridge network which receives the signal and has generally square law characteristics, with its conformance to square law improved by a compensating circuit coupled to the bridge network. The compensating circuit comprises a pair of series reverse-connected tunnel diodes and a resistor connected in series with the pair of diodes. The resistor may be a variable resistor, in which case the amount of compensation provided by the compensating circuit may be varied through adjustment of the resistor until the bridge network provides a true square law response to input signals having complex waveforms.

For a better understanding of the present invention, together with other and further objects thereof, reference may be had to the following description taken in connection with the accompanying drawings, the scope of the invention being pointed out in the appended claims.

Referring to the drawings:

FIGURE 1 is a schematic diagram of a voltmeter circuit constructed in accordance with the principles of this invention.

FIGURE 2 graphically depicts virtually a full range of individual and composite voltage-current characteristics of two series reverse-connected tunnel diodes.

FIGURE 2A is an enlarged view of the first quadrant of FIGURE 2 and depicts the first quadrant portion of the composite voltage-current characteristic curve which is ideally utilized by this invention.

FIGURE 3 graphically depicts the effect that a series resistance has on the composite voltage-current characteristic curve and, hence, on the compensating action of the circuit of this invention.

FIGURE 5 illustrates the restoration into a pure sinusoidal waveform of the current which flows into a meter connected across two terminals of a bridge rectifier as a result of a compensated voltage being applied to the bridge rectifier.

Figure 1:
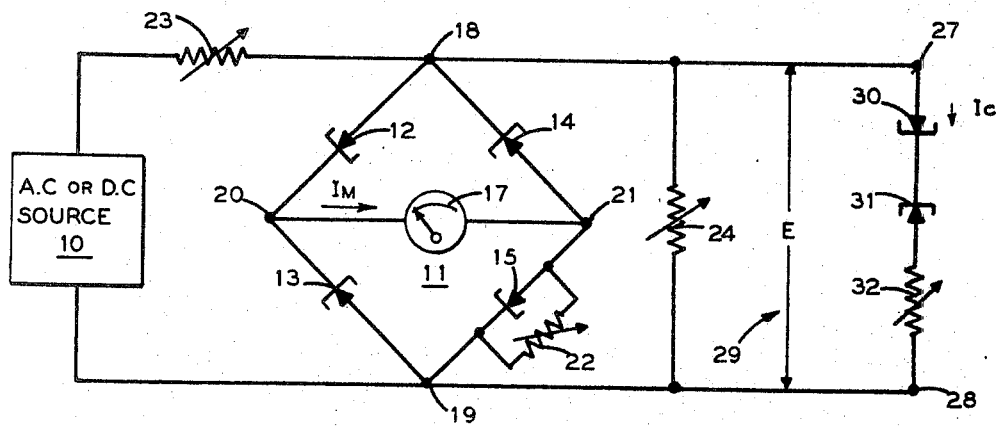

FIGURE 1 of the drawing illustrates a voltmeter circuit constructed in accordance with the present invention for measuring the R.M.S. value of the output voltage from an alternating or direct-current voltage source 10. The voltage from the source 10 is received by a conventional nonlinear full wave rectifying bridge 11 having four bridge arms. Each bridge arm includes a tunnel diode individually designated by the numerals 12, 13, 14 and 15. These diodes are preferably matched to one another and each diode pair 12, 13 and 14, 15 is series reverse-connected between opposite bridge input terminals 18 and 19. For a given polarity of voltage at the terminals 18 and 19, one diode of each pair is poled to conduct current in the forward direction and the other diode of that pair is poled to conduct current in the reverse direction. Unlike conventional assymetrically-conducting p-n junction diodes which present a low resistance to current flow in the forward direction and high resistance to current flow in the reverse direction, tunnel diodes present a relatively high resistance to forward current flow and a relatively low resistance to reverse current flow. Thus, if the terminal 18 is assumed to be at a more positive voltage than the terminal 19, the diode 12 is poled to present a high resistance to current flow through its associated arm of the bridge 11, whereas the diode 13 is poled to present a relatively low resistance to that current flow through its associated arm of the bridge.

Although the bridge 11 is illustrated as having a tunnel diode in each arm, a lesser number of tunnel diodes will provide the desired full wave voltage rectifying action of the bridge 11. For example, the bridge 11 may comprise only a single tunnel diode in one of its four arms, the three remaining arms each incorporating a resistor which offers a resistance to relatively small amplitude voltages equal to the average value of the forward and reverse resistance of the arm containing the tunnel diode. Tunnel diodes provide several recognized advantages over more conventional solid state diodes or thermionic diodes, the advantage of primary import to this invention, as mentioned above, being that tunnel diodes are less temperature dependent than other types of diodes. Accordingly, tunnel diodes, rather than the more conventional diodes are included in the illustrative embodiment of the bridge 11.

A conventional D.C. voltmeter 17 is connected across the terminals 20 and 21. The voltmeter 17 may be of a fixed magnet-moving coil type with an indicating vane rotated by coil rotation, the vane displacement being proportional to the average or mean value of the instantaneous meter current $I_M$. The scale of the meter 17 may be calibrated to translate the displacement of the meter vane into a reading of the R.M.S. value of the instantaneous voltage applied to the terminals 18 and 19.

The tunnel diodes comprising the bridge 11 are generally not perfectly matched and produce a small bridge unbalance that is particularly noticeable when a D.C. voltage which undergoes polarity reversals is supplied by the source 10. To balance the bridge, a variable resistor 22 is provided, the resistor 22 being connected in parallel across one of the tunnel diodes, for instance, the tunnel diode 15. The resistor 22 may be adjusted manually until bridge unbalances produced by D.C. voltage polarity reversals are nullified.

The voltmeter of this invention is typically connected to a source 10 which provides output voltages ranging from 0–100 millivolts R.M.S., the latter voltage being slightly greater than the desired maximum voltage range of the bridge 11 and the desired maximum voltage range of the hereinafter-described compensating circuit. To reduce proportionately the effective value of the voltage which appears across the meter terminals 20 and 21 to the desired maximum range and, more specifically, to a value of approximately 40 millivolts, the voltage from the source 10 is divided by a variable resistor 23. The resistor 23 is adjustable to provide full scale voltage sensitivity of the meter 17 with either a full scale D.C. or a full scale pure sinusoidal voltage applied to the voltmeter by the source 10. A variable resistor 24 is connected to shunt the input terminals 18 and 19 and is adjusted prior to the aforedescribed adjustment of the resistor 23 to provide the desired full scale current sensitivity of the meter 17.

Terminals 27 and 28 form the input terminals of a circuit 29 which shapes the waveform of the voltage supplied to the meter terminals 20 and 21 so as to provide a meter current waveform having true square law characteristics. The terminals 27 and 28 are connected to respective opposite ends of the variable resistor 24 and, hence, to the bridge input terminals 18 and 19, respectively. A pair of tunnel diodes 30 and 31 are poled in opposition and series-connected between the terminals 27 and 28 in the same manner that the diodes 12 and 13 are connected to the bridge terminals 18 and 19, respectively. In addition, a variable resistor 32 is connected in series with the diodes 30 and 31. The tunnel diodes 30 and 31 are preferably matched to the diode or diodes which are included in the arm or arms of the bridge 11 and are ideally operated within and slightly beyond the first positive linear resistance regions of their individuals voltage-current characteristic curves. The individual characteristic curves of tunnel diodes may be expected to vary slightly depending upon the particular commercial type of tunnel diode used. Typically, however, the full range individual characteristic curves of two tunnel diodes connected series-opposed and in series with an adjustable direct current source are as depicted graphically by the broken line curves designated 40 and 41, respectively, in FIGURE 2.

Figure 2:
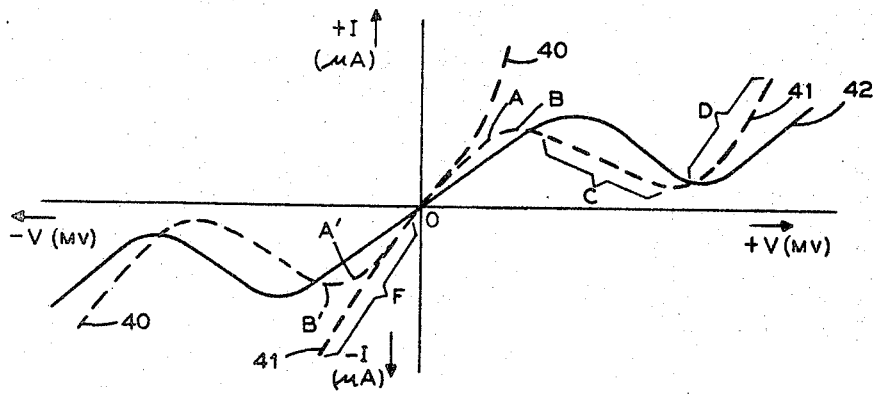

Referring to FIGURE 2, the curve 41 graphically depicts the relationship between the current which flows through and the voltage which appears across a typical, commercially available tunnel diode. The first quadrant or forward current portion of the characteristic curve 41 includes a first positive linear resistance region which extends from the intersection or origin of the voltage-current coordinate axes to the point A. Between this region and the beginning of the negative resistance region C is a parabolic region which peaks at a point designated by the letter B. Following the negative resistance region C is a second positive resistance region D.

The third quadrant or reverse current portion of the curve 41 has another positive linear resistance region F which intersects the origin and has a resistance value which is approximately the same as the resistance value of the first positive resistance region. The characteristic curve 40 graphically depicts the voltage-current characteristics of, for example, the same or a matched tunnel diode which is poled reverse to the direction of assumed current flow.

It will be apparent that the characteristic curve of a series reverse-connected diode is merely a reflection about the origin of a matched series forward-connected diode characteristic curve. Thus, the letters A' and B' designate points on the characteristic of the reverse-connected diode which correspond to the points A and B, respectively, on the forward-connected diode. Considering the curves 40 and 41 with respect to the diodes 30 and 31, FIGURE 1, those portions of the curves 40 and 41 which lie in the first quadrant represent a plot of the voltage-current characteristic of the diodes 31 and 30, respectively, with the diode 30 poled for forward current flow and the diode 31 poled for reverse current flow. This condition occurs in the compensating circuit 29 when the potential E applied to the terminal 27 is positive with respect to the potential of the terminal 28. If the voltage polarity of the terminals 27 and 29 reverses so that the potential applied to the terminal 28 is positive with respect to the potential of the terminal 27, the voltage-current characteristic of the diodes 30 and 31 will be as depicted by those portions of the curves 41 and 40, respectively, which lie in the third quadrant.

Figure 2A:
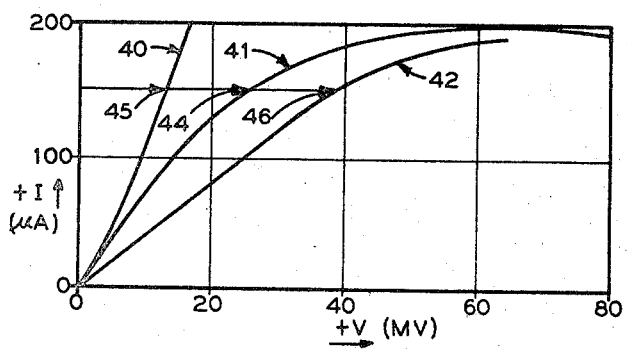
Figure 3:
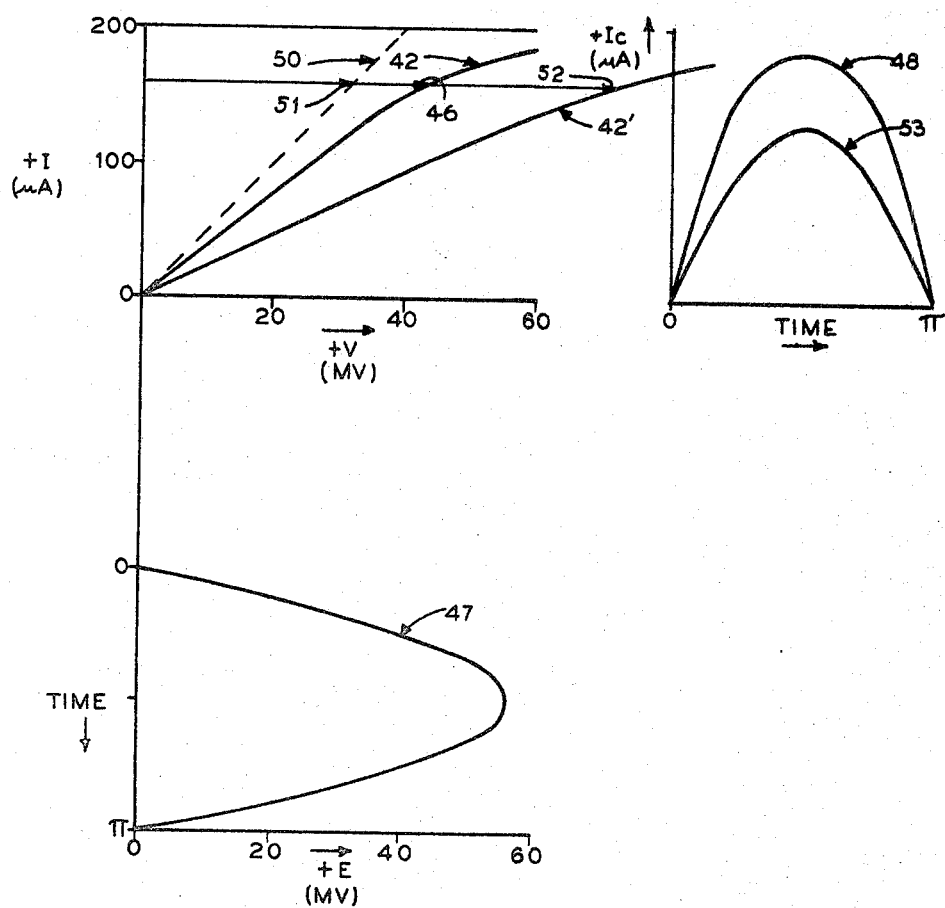
Figure 4:
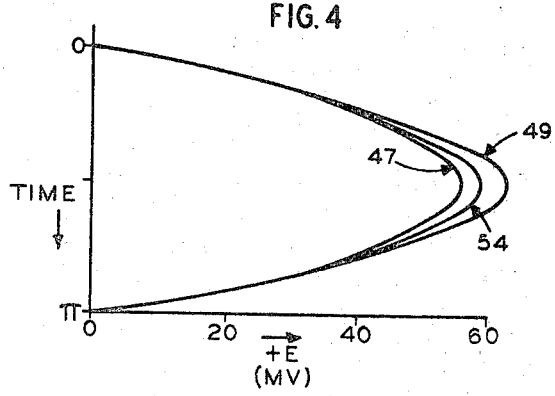
FIGURE 4 depicts a sinusoidal waveform of fundamental frequency having superimposed thereon two sinusoidal waveforms containing different amounts of third harmonics.

Assuming that the resistor 32 is short circuited or otherwise effectively removed from the compensating circuit 29 so that only the diodes 30 and 31 are series reverse-connected between the terminals 27 and 28, the composite or average voltage-current characteristic curve for both diodes 30 and 31 for the full range of applied current and voltage is obtained by summing the individual voltages which appear across each diode for corresponding values of current. The resulting first quadrant curve is designated by the numeral 42 in FIGURE 2A to which attention is now invited. Since the voltage-current characteristic curves in the first quadrant reflect into the third quadrant, for expediency, only the regions of the characteristic curves which lie in the first quadrant between the origin and the beginning of the negative resistance region of the forward conducting tunnel diode are depicted in FIGURES 2A, 3 and 4.

With a current of, for example, 160 microamperes, the voltage which appears across the diode 30 is proportional to the length of a voltage component 44 and the voltage which appears across the diode 31 is proportional to the length of a voltage component 45 taken from the current axis. The summation of these two voltages is represented by a third voltage component 46 which also extends from the current axis. The head of the component 46 establishes one point on a composite voltage-current characteristic curve 42 and the remaining points which are joined by the curve 42 may be plotted in a similar manner.

For typical, commercial available tunnel diodes, the voltage range which provides the composite first positive linear resistance regions is between +40 millivolts in the first quadrant and +40 millivolts in the third quadrant by virtue of characteristic symmetry. When an input voltage signal is applied to the compensating circuit 29, the composite characteristic curve 42 may be regarded as a dynamic transfer characteristic curve, FIGURE 3, the characteristics of which determine the amplitude and waveform of the current Ic which flows through the compensating circuit 29. Assuming that the source 10, FIGURE 1, produces a pure sinusoidal voltage having a peak amplitude of 100 millivolts or a D.C. voltage 100 millivolts, and that the resistor 23 divides this voltage and provides a bridge voltage having a peak amplitude of 40 millivolts, the instantaneous amplitude of the compensting current Ic which flows through the compensating circuit 29 will be directly proportional to the amplitude of the bridge voltage E. If, however, the source 10 produces a pure sinusoidal voltage having an R.M.S. value of 100 millivolts, the voltage E which appears across the compenstaing circuit 29 will tend to have an R.M.S. value of 40 millivolts and, consequently, a peak voltage amplitude of approximately 56 millivolts. As illustrated by FIGURE 3, a pure sinusoidal waveform 47 symmetrical about a zero voltage axis and having an R.M.S. value of 40 millivolts, when applied to the dynamic transfer characteristic curve 42, will produce a clipped compensating current waveform 48 since the positive (and negative) peaks of the waveform 47 are transferred by the parabolic regions of the transfer characteristic curve 42.

Since the compensating current Ic also flows through the resistor 23 when the positive and negative peaks of the compensating current waveform 29 are clipped, the magnitude of the voltage drop across the resistor 23 is reduced a proportional amount and the magnitude of the voltage which appears across the bridge terminals 18 and 19 is increased a proportional amount. Under these conditions, the voltage E, which appears across the bridge input terminals 18 and 19, includes a relatively large amplitude third harmonic component such as designated by the numeral 49 in FIGURES 4 and 5.

The effect of this third harmonic on the current which flows into the meter 17 having, for example, a 10 millivolt, 100 microampere movement is depicted in FIGURE 5. As may be seen in this figure, the transfer characteristic curve of the rectifier bridge 11, plotted with meter current $I_M$ as the ordinate and the bridge voltage E as the abscissa, has a true parabolic shape for meter currents up to approximately 150 microamperes. That portion of the transfer characteristic curve which is designated by the numeral 58 represents an ideal parabolic transfer characteristic which conforms exactly to the equation $$I_M = KE^2$$

The adjacent solid line portion, designated by the numeral 61, departs from the ideal characteristic curve as a fourth power of bridge voltage E and represents an actual transfer characteristic of a full wave rectifier bridge for values of meter current greater than, for example, 150 microamperes. If a pure sinusoidal voltage waveform 47 is applied to an ideal bridge transfer characteristic, the meter current $I_M$ will be a double frequency pure sine wave exhibiting true square law characteristics and have an average value of 100 microamperes equal to a full scale reading of the meter 17. The waveform of this pure sinusoidal current is designated by the numeral 59 in FIGURE 5. However, the application of the waveform 47 to the portion 61 of the actual transfer characteristic curve will produce a meter current waveform 62 that peaks at a significantly lower level than the pure sinusoidal waveform 59 and has an average value of current that is less than 100 microamperes causing the meter to read less than full scale and causing a less-than-square law response of the rectifier bridge 11. Hence, the condition corresponding to this situation may be termed one of "under compensation" of the bridge.

If the bridge voltage has a waveform, such as designated by the numeral 49, which includes a large order third harmonic component, the meter current $I_M$ will peak as indicated by the numeral 62 at a significantly higher level than the waveform 59, and will have an average value significantly greater than 100 microamperes. This higher peaking of the meter current will cause deflection of the meter vane to a more-than-full scale position and consequent exhibition of a greater-than-square law response to the bridge voltage E. Hence, the condition corresponding to this situation may be termed one of "over compensation" of the bridge.

In accordance with this invention, there is included in the bridge voltage E a certain amount of third harmonic such that the meter 17, when deflected full scale, reads the true R.M.S. value of a sinusoidal signal received from the source 10. This result is obtained through the use of the resistor 32 that acts in conjunction with the diodes 30 and 31 to produce the required amount of third harmonic in the bridge voltage E which will provide a meter current having true square law characteristics. Accordingly, it will now be assumed that the resistor 32 is effectively in the compensating circuit 29 and that it is connected in series with the tunnel diodes 30 and 31, as depicted in FIGURE 1. The resistor 32 is made adjustable so as to provide a variable amount of clipping of the waveform of the compensating current Ic, FIGURE 3.

The voltage-current characteristic of the resistor 32 is designated by the numeral 50 in FIGURE 3, and consists of a straight line which passes through the origin of the voltage-current coordinate system. The resistor 32, in effect, decreases the positive slope of the linear portions of the transfer characteristic curve 42 to provide a composite transfer characteristic curve 42'. The composite transfer characteristic curve 42' may be plotted on the same axis by summing the voltage across the resistor 32 and the composite voltage across the diodes 30 and 31 for a given amplitude of current flow through these components. For example, at a constant current amplitude of 160 microamperes, the length of the horizontal voltage component 51 is proportional to the magnitude of the voltage drop which appears across the resistor 32. This voltage component is added to the horizontal voltage component 46, the length of the component 46 being proportional to the magnitude of the voltage drop which appears across both series-connected tunnel diodes 30 and 31 for that value of current. The summing of these two voltage components yields the voltage component 52.

It will now be apparent that if a pure sinusoidal voltage having a waveform such as designated by the numeral 47 in FIGURE 4, and an R.M.S. value of 40 millivolts is now applied to the circuit 29, the 56 millivolt peak amplitude of the waveform 47 will be transferred entirely to the linear portion of the dynamic transfer characteristic curve 42' and, hence, the compensating current Ic which flows through the circuit 29 will now be a current having a pure sinusoidal waveform, as indicated by the numeral 53. Thus, the effect of adding the resistor 32 to the circuit 29 is to increase the linear voltage range of the dynamic transfer characteristic curve of the compensating circuit 29 by an amount proportional to the resistance value of the resistor 32. Since the amount by which the peak of the compensating current Ic is clipped is established by adjustment of the ohmic value of the resistor 32, through this simple adjustment it is possible to provide the bridge voltage E with the desired amount of compensating third harmonic component.

In practice, the desired amount of third harmonic in the voltage E is provided by disconnecting the source 10 from the bridge 11 and replacing it by a standard D.C. current and voltage supply which supplies the bridge 11 with a current and voltage having magnitudes equal to that required to cause full scale deflection of the meter 17. The resistors 23 and 24 may then be adjusted to provide respective current and voltage sensitivities to the meter 11 so that the meter produces full scale deflection with those values of input current and voltage. The standard source may then be disconnected from the terminals 18 and 19 and these terminals connected to an alternating current source which provides a pure sinusoidal voltage having a known R.M.S. value equal to the value of the voltage required to produce the same full scale deflection of the meter 17. The resistor 32 may then be adjusted to provide the amount of third harmonic required to cause the meter 17 to read full scale with this fundamental sine voltage and current applied to the bridge input terminals.

For reasons related hereinabove, it will be evident that by adjusting the resistor 32, the slope of the first linear resistance regions of the transfer characteristic curve 42, FIGURE 3, is made to vary until the current Ic is clipped by the contiguous nonlinear regions just enough to produce the amount of third harmonic voltage to the bridge 11 which will cause the meter 17 to read full scale. This waveform of this voltage is designated by the numeral 54 in FIGURES 4 and 5 and has a smaller amplitude than the amplitude of the waveform 49 generated when the value at the resistor 32 was assumed to be equal to zero ohms. The waveform 54, FIGURE 5, when transferred to the actual transfer characteristic curve 61 of the rectifier bridge produces a meter current waveform which is practically identical to the pure sinusoidal waveform 59 produced by transferring the pure sinusoidal waveform 47 to the ideal transfer characteristic curve 58. Thus, the meter current which is now produced has an average value of 100 microamperes and effects the desired full scale deflection of the meter 17.

Since there are no reactive components in the voltmeter of this invention, the response of the voltmeter to complex input signals is limited only by the frequency response of its tunnel diodes or the inductance of the meter 17, whichever is the lesser. The frequency response of the meter 17 may be substantially increased through the technique of shunting any meter inductance with a series resistance-capacitance circuit and results in the frequency response of the tunnel diodes becoming the controlling factor. The meter 17 will provide an indication of the true R.M.S. value of the complex voltage waveform as long as the additive effect of the various harmonic components does not increase the peak amplitude of the voltage applied to the compensating circuit 29 to a level such that "over compensation" of the bridge 11 results. It will be evident that the aforedescribed circuit will also provide compensation to D.C. as well as A.C. bridge voltages since for any point on the A.C. voltage waveform there is a corresponding point on a line representing a D.C. bridge voltage.

The following list of values has been found suitable in the implementation of one practical embodiment of the R.M.S. voltmeter circuit illustrated in FIGURE 1. This specific embodiment was used to measure an input voltage (A.C. or D.C.) having an effective value of 100 millivolts with an input current of 1 milliampere and, thus, draws only 100 microwatts of energy from the input signal.

| | |
|---|---|
| Meter 17 | Weston D.C. Model 622 (10 millivolt, 100 microampere movement). |
| Diodes 12, 13, 14, 15, 30 and 31 | General Electric BD-3. |
| Resistor 22 | 3300 ohms. |
| Resistor 23 | 47 ohms. |
| Resistor 24 | 120 ohms. |
| Resistor 32 | 200 ohms. |

It was proven experimentally that this particular embodiment, with the compensating circuit 29 disconnected from the squaring bridge 11, typically produced a 2% error in indicating the amplitude of an applied A.C. voltage having a half cycle peak amplitude of 100 millivolts and a 33% third harmonic. With the compensating circuit 29 connected as shown in FIGURE 1, having component values as indicated in the above list and with the same applied A.C. voltage, the indicating error was reduced to 0.2%.

Although the measuring circuit has been described as a voltmeter, an ammeter counterpart could be provided by replacing the resistor 23 with a resistor of relatively small value connected to shunt bridge input terminals 18 and 19. The resistor 24 would be removed from the voltmeter circuit and the compensating circuit 29 connected across the output terminals 20 and 21 to shunt the meter 17.

While there has been described what is at present considered to be preferred embodiments of this invention, it will be obvious to those skilled in the art that various changes and modifications may be made in the circuit without departing from the invention, and it is, therefore, intended to cover all such changes and modifications as fall within the true spirit and scope of the invention.

What is claimed is:

1. In an electrical circuit for measuring the magnitude of an electrical signal, converting means having a pair of input terminals receiving said electrical signal for converting said signal into a waveform which conforms substantially to the square of the instantaneous magnitude of the electrical signal, said converting means having a pair of output terminals which receive said waveform, and means including at least two nonlinear devices coupled to each other in series-opposition and connected across one pair of said terminals of the converting means for improving the conformance of the converted signal to the square of the instantaneous magnitude of said electrical signal.

2. The circuit as claimed in claim 1 wherein said two nonlinear devices comprise two tunnel diodes having substantially symmetrical voltage-current characteristics.

3. The electrical circuit as claimed in claim 2 wherein said means for improving the square law characteristics of said converted signal additionally comprises, a resistor connected in series with said tunnel diodes.

4. In an electrical circuit for measuring the magnitude of an electrical signal, signal rectifying means for converting the electrical signal into an output signal representable by a waveform which conforms substantially to the square of the instantaneous magnitude of the electrical signal, and circuit means connected in parallel with said rectifying means for improving the conformance of said output signal to the square of the instantaneous magnitude of said electrical signal, said circuit means comprising, at least two tunnel diodes having substantially symmetrical voltage-current characteristics connected in series-opposition and a variable resistor in series with said tunnel diodes.

5. Apparatus for measuring the magnitude of an electrical signal comprising, signal rectifying means having a substantially parabolic transfer characteristic for converting the electrical signal into an output signal representable by a waveform which conforms substantially to the square of the instantaneous magnitude of said electrical signal, compensating means connected in parallel with said rectifying means for increasing the conformance of said output signal waveform to the square of the instantaneous magnitude of said electrical signal, said compensating means including at least two tunnel diodes having substantially symmetrical voltage-current characteristics connected in series-opposition and a resistor in series with said tunnel diodes, and means coupled to said rectifying means and responsive to said output singal for indicating the magnitude of said electrical signal.

6. Apparatus as claimed in claim 5 wherein said rectifying means comprises, a rectifier bridge comprised of at least one tunnel diode, said one diode having substantially the same voltage-current characteristic as one of said two tunnel diodes.

7. An electrical circuit for measuring the amplitude of an A.C. or D.C. input signal comprising, a nonlinear rectifier bridge having first and second pairs of terminals, the first pair of bridge terminals receiving the A.C. or D.C. input signal, indicating means connected to the second pair of bridge terminals for providing an indication of the amplitude of rectified current received from said second pair of terminals, and means connected to one pair of the two pair of bridge terminals for improving the square law response of said bridge to said input signal, said means including at least one pair of series reverse-connected tunnel diodes and a resistor in series with said tunnel diodes.

8. The circuit as claimed in claim 7, wherein said means is connected to shunt the first pair of terminals.

9. The circuit as claimed in claim 7, wherein said means is connected to shunt the second pair of terminals.

10. The circuit as claimed in claim 7, wherein said rectifier bridge includes two pairs of bridge arms and wherein a tunnel diode is connected in at least one of said bridge arms.

11. The circuit as claimed in claim 10, wherein said two pairs of bridge arms are connected together at said first pair of bridge terminals and wherein at least one pair of said two pair of bridge arms includes at least two series reverse-connected tunnel diodes having one terminal of said second pair of bridge terminals therebetween.

12. The circuit as claimed in claim 11, wherein said pair of series reverse-connected tunnel diodes included in said one pair of bridge arms are matched to the series reverse-connected tunnel diodes included in said means for improving the square law characteristics of the rectified current.

13. The circuit as claimed in claim 7, wherein said indicating means comprises a meter responsive to the average value of the rectified current received from said second pair of bridge terminals.

14. The circuit as claimed in claim 13, wherein said meter comprises an R.M.S.-calibrated D.C. meter.

References Cited

UNITED STATES PATENTS

| | | | |
|---|---|---|---|
| 1,966,047 | 7/1934 | Ryall | 324—119 |
| 2,137,846 | 11/1938 | Klutke | 324—119 |
| 2,198,226 | 4/1940 | Peterson | 324—119 XR |
| 2,294,065 | 8/1942 | Anderson | 324—119 |
| 3,256,475 | 6/1966 | Kelly | 307—321 XR |
| 3,275,941 | 9/1966 | Brechling | 329—205 XR |
| 3,281,689 | 10/1966 | Schneider et al. | 324—119 XR |

WILLIAM E. LINDQUIST, Primary Examiner

ERNEST F. KARLSEN, Assistant Examiner

U.S. Cl. X.R.

321—9